US012705671B1

(12) United States Patent
Relihan

(10) Patent No.: US 12,705,671 B1
(45) Date of Patent: Aug. 11, 2026

(54) TOKEN-BASED ONLINE RAFFLE SYSTEM

(71) Applicant: RaffleLounge LLC, Wilmington, DE (US)

(72) Inventor: Brandon Gerard Relihan, Greenwich, CT (US)

(73) Assignee: RaffleLounge LLC, Wilmington, DE (US)

( * ) Notice: Subject to any disclaimer, the term of this patent is extended or adjusted under 35 U.S.C. 154(b) by 0 days.

(21) Appl. No.: 19/336,742

(22) Filed: Sep. 23, 2025

Related U.S. Application Data

(60) Provisional application No. 63/868,643, filed on Aug. 22, 2025.

(51) Int. Cl.
*G06Q 30/00* (2023.01)
*G06Q 30/08* (2012.01)
*G06Q 40/04* (2012.01)
*G07F 17/32* (2006.01)

(52) U.S. Cl.
CPC .......... *G06Q 40/055* (2025.08); *G06Q 30/08* (2013.01); *G07F 17/3248* (2013.01)

(58) Field of Classification Search
CPC ................................................ G06Q 30/06–08
See application file for complete search history.

(56) References Cited

U.S. PATENT DOCUMENTS 8,038,519 B1 * 10/2011 Luciano, Jr. .......... G07F 17/326 463/19
2007/0129139 A1 * 6/2007 Nguyen .............. G07F 17/3262 463/16
2009/0036192 A1 * 2/2009 Hughes ................. G07F 17/329 463/17
2023/0023409 A1 * 1/2023 Thomas ............. G06Q 30/0223
2025/0095453 A1 * 3/2025 Parei ...................... G07F 17/329
2025/0262522 A1 * 8/2025 Alsalih Altaheni .. G07C 15/006
2025/0292338 A1 * 9/2025 Imam .................. G07F 17/3255
2025/0342496 A1 * 11/2025 Alhakim ................ G06Q 50/01

OTHER PUBLICATIONS

Singer, Johannes, et al., “How do Gambling Providers Use the Social Network Twitter in Germany? An Explorative Mixed-Methods Topic Modeling Approach”, Journal of Gambling Studies 39(3): 1371-1398, Sep. 14, 2022 (Year: 2022).*

* cited by examiner

*Primary Examiner* — Ethan D Civan
(74) *Attorney, Agent, or Firm* — Fox Rothschild LLP

(57) ABSTRACT

A method for transferring ownership of an asset via an online raffle includes receiving asset information including a minimum selling price (in raffle tokens) and a maximum listing duration for a raffle of the asset. The method further includes providing a representation of the asset via a user interface based on the asset information. The method further includes issuing raffle tokens. The method further includes receiving an asset selection including a pledged amount of raffle tokens. In response to a value of aggregate pledged raffle tokens satisfying the minimum selling price during the listing duration, the method includes: probabilistically selecting a raffle token; determining a consumer associated with the selected raffle token; and providing a notification to the consumer, including an offer to transfer ownership of the asset. In response to acceptance of the offer, the method includes transferring ownership of the asset to the consumer.

20 Claims, 8 Drawing Sheets

TOKEN-BASED ONLINE RAFFLE SYSTEM

This application claims priority to U.S. Provisional Application 63/868,643, titled TOKEN-BASED ONLINE RAFFLE SYSTEM, filed Aug. 22, 2025. The entire disclosure of that application is incorporated herein by reference in its entirety.

BACKGROUND

An online auction generally involves buying and selling goods or services by offering them up for bids, taking bids, and then selling the item to the highest bidder or buying the item from the lowest bidder. Users interact one-on-one with auction sites, largely isolated from other users and the interactions of other users during the auction period. This arrangement, inherent in online auctions, limits user engagement and, therefore, hinders user participation. Furthermore, potential buyers may feel excluded from the auction if they have insufficient funds to purchase an item at full price. Differences in currencies and limited payment options across different regions can further inhibit some users from participating in online auctions or raffles. This disclosure addresses those issues and others.

SUMMARY

The present disclosure describes embodiments related to online marketplaces with enhanced user engagement features.

In an embodiment, a method for transferring ownership of an asset via an online raffle includes receiving, from an asset owner, asset information for an asset, the asset information including a minimum selling price expressed in raffle tokens and a maximum listing duration for a raffle of the asset. The method further includes providing, to one or more consumers, a representation of the asset via a user interface, the representation including information based on the asset information. The method further includes issuing, to the one or more consumers, raffle tokens each having a predefined monetary value. The method further includes receiving, from at least one consumer, an asset selection including an indication of the asset and a pledged amount of the raffle tokens for entry into the raffle. In response to a value of aggregate pledged raffle tokens for the asset satisfying the minimum selling price during the maximum listing duration, the method includes determining a raffle winner by probabilistically selecting one of the pledged raffle tokens from the aggregate pledged raffle tokens. The method further includes determining a consumer associated with the selected raffle token. The method further includes providing a first notification to the consumer associated with the selected raffle token, the first notification including an offer to transfer ownership of the asset to the consumer. In response to acceptance of the offer by the consumer associated with the selected raffle token, the method further includes transferring ownership of the asset to the consumer.

Implementations of the disclosure may include one or more of the following optional features. In some examples, the asset includes a product, good, or service. The method may further include providing a second notification to the consumer associated with the selected raffle token, the second notification including an offer to pay the consumer a specified amount of money in lieu of transferring ownership of the asset; and in response to the consumer accepting the offer of the second notification, paying the specified amount of money to the consumer. The method may further include in response to the consumer accepting the offer of the second notification, relisting the asset for an additional raffle having a further listing duration. The method may further include adjusting one or more parameters of the additional raffle based on results of a previous raffle of the asset.

In some examples, providing the representation of the asset includes, for the asset, displaying an image of the asset, an indication of the minimum selling price (e.g., in raffle tokens), a current value of the aggregate pledged raffle tokens for the asset, and an indication of the maximum listing duration for the raffle. The method may further include, in response to receiving the asset selection from the consumer, automatically calculating and displaying to the consumer odds of the consumer winning the raffle, the odds being based on the pledged amount of tokens by the consumer relative to the aggregate pledged tokens. Providing the representation of the asset further may include displaying, for each consumer who has made an asset selection, the pledged amount of raffle tokens by that consumer and odds of that consumer winning the raffle.

In some examples, receiving, from the at least one consumer, the asset selection including the indication of the asset and the pledged amount of the raffle tokens for entry into the raffle includes: receiving, from each of multiple consumers, a separate asset selection. The method may further include, in response to determining the consumer associated with the selected raffle token as the winner, providing a notification to at least one other consumer who is not associated with the selected raffle token, the notification indicating an outcome of the raffle and an identity or identifier of the raffle winner.

Providing the representation of the asset may further include displaying a community interaction interface associated with the raffle, the community interaction interface configured to allow consumers to exchange messages related to the raffle. Displaying the community interaction interface may further include displaying a countdown timer indicating a time remaining before a scheduled raffle drawing. Displaying the community interaction interface may further include displaying an animated graphical sequence during selection of the raffle winner, the animated graphical sequence visually simulating a random drawing process.

receiving the asset selection from the consumer may include providing, to the consumer, a user interface element for specifying the pledged amount of raffle tokens; and receiving, via the user interface element, an input from the consumer indicating the pledged amount of raffle tokens to purchase for the raffle. The raffle tokens may include electronic tokens stored in one or more user accounts in a database. Issuing the raffle tokens may include providing a user interface prompting a user to transfer monetary value in exchange for the raffle tokens. Issuing the raffle tokens may include issuing tokens corresponding to a standardized unit of currency. In some examples, issuing tokens corresponding to a standardized unit of currency includes issuing tokens corresponding to United States dollar. The method may further include receiving, from the consumer, a payment of monetary value in exchange for the raffle tokens and converting, if the payment is not in United States dollars, the monetary value into United States dollars based on one or more exchange rates so as to determine an equivalent number of whole raffle tokens to issue.

In some examples, the method further includes awarding one or more virtual rewards to users based on participation in one or more raffles, the virtual rewards including at least one of loyalty points or achievement badges. The method may include receiving, from the asset owner, one or more additional raffle configuration parameters for the asset, the one or more additional raffle configuration parameters including: a maximum number of raffle tickets available for the raffle of the asset; an indication of whether a winner sell-back option is enabled for the raffle; or one or more geographic restrictions defining eligible participant locations for the raffle.

One or more steps of the method may be performed by an online marketplace system, wherein consumers have associated reputation scores or levels within the online marketplace system. In some examples, the method further includes restricting issuing raffle tokens to consumers who satisfy a predetermined community reputation criterion within the online marketplace system.

In an embodiment, a system includes one or more processors and a non-transitory machine-readable storage medium coupled to the one or more processors and storing instructions that, when executed by the one or more processors, cause the system to perform operations including receiving, from an asset owner, asset information for an asset, the asset information including a minimum selling price expressed in raffle tokens and a maximum listing duration for a raffle of the asset. The operations further include providing, to one or more consumers, a representation of the asset via a user interface, the representation including information based on the asset information. The operations further include issuing, to the one or more consumers, raffle tokens each having a predefined monetary value. The operations further include receiving, from at least one consumer, an asset selection including an indication of the asset and a pledged amount of the raffle tokens for entry into the raffle. In response to a value of aggregate pledged raffle tokens for the asset satisfying the minimum selling price during the maximum listing duration, the operations further include determining a raffle winner by probabilistically selecting one of the pledged raffle tokens from the aggregate pledged raffle tokens. The operations further include determining a consumer associated with the selected raffle token. The operations further include providing a first notification to the consumer associated with the selected raffle token, the first notification including an offer to transfer ownership of the asset to the consumer. In response to acceptance of the offer by the consumer associated with the selected raffle token, the operations further include transferring ownership of the asset to the consumer.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
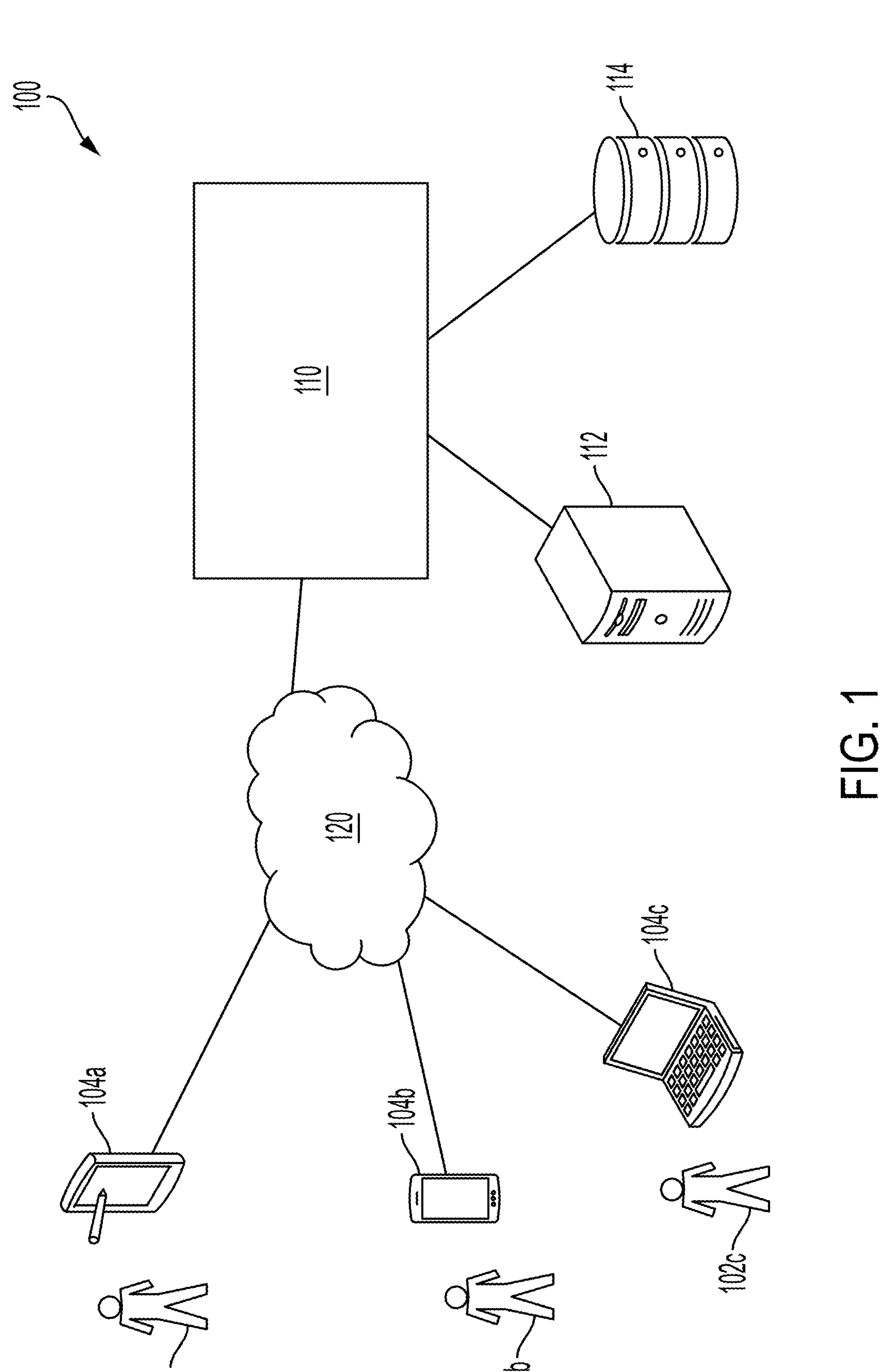
FIG. 1 shows an example online marketplace environment in which the disclosed raffle system operates.

The present disclosure describes embodiments of an online marketplace with enhanced user-engagement features. In particular, the platform implements a standardized token-based system for raffle transactions, wherein each token (or raffle ticket) is assigned a fixed value tied to a standard unit of currency. For example, 1 token equals 1 U.S. dollar, regardless of the user's location. Participants can fund their accounts or purchase these tokens using various payment methods and currencies (including foreign currencies or cryptocurrencies), with the system converting such payments into an equivalent number of U.S. dollar-denominated tokens. By standardizing all raffle tickets to a common currency value, the platform ensures that every user participates on equal footing and that ticket values remain consistent across different regions and payment types. In this example, the tokens each have a fixed monetary value of one United States dollar. The tokens themselves may be stablecoins (including fiat-backed, crypto-backed, algorithmic, and commodity-backed stablecoins) as well as Central-Bank Digital Currencies (CBDCs) that are pegged to the United States dollar (USD).

The platform further provides an interactive raffle ticket-purchasing interface that dynamically displays each user's odds of winning in real time. For example, a user interface may present a sliding bar or similar input mechanism that allows a user to select how many raffle tickets to purchase for a given item's raffle. As the user adjusts the number of tickets via this interface, the system's real-time odds engine calculates and displays the user's exact current chance of winning (e.g., as a percentage), based on the proportion of the total tickets that the user holds. Because each raffle ticket corresponds to a fixed monetary value (the standardized token), the odds calculation remains a straightforward ratio of the user's tokens to the total tokens in play, allowing accurate and immediate feedback on win probability. Providing continuous, real-time feedback in this way is designed to drive user engagement.

This fixed token system, combined with a virtual "raffle lounge" where users can interact via live chat and witness the drawing live, creates a more engaging and transparent online raffle experience. By linking a fixed token value to a real-time odds engine, the disclosed platform enables a unique user experience in which participants can intuitively understand and control their raffle involvement, while the system seamlessly handles currency normalization, real-time updates, and outcome determination.

By fixing each raffle ticket's value to a standard currency unit—e.g., 1 USD per token—RaffleLounge eliminates the variability and complexity that normally arise when items are priced in different currencies, denominations, or dynamic pricing models.

This means the total number of tickets available for any listing is directly proportional to the seller's set price, with no need for further conversion or arbitrary rounding.

Because every ticket holds identical monetary weight, the odds for any participant can be calculated instantly and expressed as a simple fraction:

$$\text{Odds} = \frac{\text{Number of Tickets Purchased}}{\text{Total Tickets Available}}$$

For example: Buying 2 tickets for a $10 item instantly shows a 2/10 (20%) winning chance.

The system's built-in foreign currency and cryptocurrency conversion ensures that a buyer in Europe, Asia, or paying in Bitcoin still participates on the exact same terms as a U.S. dollar buyer.

The system/platform automatically converts the local currency amount (or crypto value) into the equivalent USD token count before any purchase.

This maintains fairness and keeps the odds calculation universally consistent—a major distinction from other raffle-style marketplaces where ticket costs and odds may vary per region.

The sliding bar odds selector in each product "lounge" leverages this fixed-token logic to display instantaneous winning probabilities:

As a buyer adjusts the bar (e.g., committing to 3 tokens instead of 2), the odds are recalculated on the fly using the fixed denominator (total tickets=item price in USD).

This creates a transparent and interactive experience, where the user visually sees the odds shift with every token committed.

This is a proprietary integration—other systems may let users choose ticket quantities, but they rarely couple this choice with live, proportional odds feedback tied to a fixed-value global token system.

The fixed 1 USD-per-token structure also simplifies:

Regulatory compliance—all raffles operate on a clearly defined monetary basis.

Auditing & reporting—easy to reconcile sales, payouts, and revenue share with sellers.

Taxation logic—because the value of each ticket is known at the point of sale, win/loss reporting becomes straightforward.

This architecture is not just a back-end accounting convenience—it is the enabler of your real-time odds calculation and sliding bar interface. It merges Currency standardization, Live odds computation, Interactive UI feedback.

In addition to the token-based economy and real-time odds display, various optional features further enhance the platform's flexibility and engagement. For instance, sellers (asset owners) can configure raffle parameters such as the minimum number of tickets required (which corresponds to a minimum selling price), a maximum number of tickets that will be sold for the raffle, whether or not the raffle winner is offered a "sell-back" option (allowing the winner to sell the item back to the platform or seller for a specified payout), and any geographic restrictions on eligible participants. The system may also include a "buyout" mechanism that allows a user to purchase all available raffle tickets for an item outright—effectively paying the full price in tokens —thereby immediately claiming the item and concluding the raffle without a random draw. The raffle drawing itself is presented via a live visual simulation (for example, an animated drawing sequence such as a spinning wheel or countdown timer), accompanied by real-time statistics on participants (e.g. each participant's number of tickets and odds of winning) to heighten excitement and transparency. A community interaction module (the virtual raffle lounge) enables features like live chat among participants and viewers, further fostering user engagement and a sense of community around each raffle. To encourage ongoing participation and trust, the platform can implement a gamified reward and reputation system—for example, awarding loyalty points or badges to users based on their raffle activity or community contributions. These points may be redeemable for raffle tickets or other benefits, and the badges or reputation levels can influence a user's eligibility for certain raffles or increase the visibility of their listings, thereby incentivizing positive participation. In some embodiments, the platform is designed with a mobile-first implementation, ensuring that all of the above features (from real-time odds display to live drawings and chat) are accessible and optimized for users on smartphones and other mobile devices, further broadening accessibility and engagement.

In one embodiment, the system implements a fixed-value tokenization model in which each raffle ticket is standardized to a monetary unit, such as 1 USD, with the capability to convert foreign currency or cryptocurrency payments into an equivalent number of tokens at the time of purchase. This fixed-value approach ensures that the total number of tokens for each listing is directly proportional to the seller's set price.

For example, if a seller lists an asset for $50 USD, exactly 50 tokens will be made available for purchase by all consumers. This structure allows the system to display precise, real-time winning odds for each consumer's pledged token count. If a consumer pledges 5 tokens in this example, their winning odds will be calculated and displayed as 5/50 (10%) immediately.

The consumer-facing interface further includes a sliding bar odds adjustment mechanism, enabling users to dynamically choose their token quantity and view updated odds instantly. This not only increases transparency and engagement but also encourages strategic participation.

The fixed-value token system, combined with universal currency conversion and the real-time sliding bar odds interface, differentiates the invention from traditional raffle or marketplace systems, where odds are not transparently calculated in real time or are not standardized across currencies.

Together, the combination of a standardized token currency, real-time odds feedback, seller-configurable raffle parameters, buyout and sell-back options, live interactive drawings, and gamified community incentives provides a novel and technically robust online raffle marketplace that increases user engagement and transparency beyond what traditional auctions or raffles offer.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes) but not limited to." The term "exemplary" is used herein to mean "by way of example," not necessarily as an indication of preference.

In the following description, when terms such as "first" and "second" are used to modify an element, they are only intended to distinguish one element from another, and not to indicate any ordering or importance unless explicitly stated. The term "about," when used in reference to a numeric value, generally includes values within ±10% of the stated number.

The present disclosure relates generally to methods and systems for online marketplaces (such as auction or sales sites) having enhanced user-engagement features. One novel aspect of the system is a virtual "raffle lounge" in which users (participants in the marketplace) may interact in real or near-real time during a raffle. Another novel aspect is an online raffle mechanism in which participants purchase tickets for a fraction of an item's price, and a winner is randomly selected and announced in real or near-real time. These features provide additional opportunities for online purchases and add excitement to the process, thus increasing user engagement. More details on these and other novel features are provided below.

(i) System Architecture and User Environment (FIG. 1)

FIG. 1 illustrates an example environment 100 for implementing an online marketplace system 110 with the enhanced raffle features. The system 110 includes or is in communication with a computing system 112 (e.g., one or more servers), as well as data stores 114 (e.g., one or more databases). The computing system 112 executes software modules that implement the functionality of the online raffle platform. The environment 100 also shows multiple users 102*a*-102*c* of the system 110, any or all of whom may participate as buyers (raffle entrants) or sellers (item listers) in the marketplace. Each user 102 accesses the system via a user device 104*a*-104*c*, such as a desktop or laptop computer, tablet, smartphone, or other network-enabled device. The system 110 communicates with user devices 104 over a network 120 (e.g., the Internet). For example, the system may include a web server and/or dedicated mobile application, allowing users 102 to interact with the platform through a web browser or app interface.

The system 110 maintains an account for each registered user 102. User account data can include profile information, payment methods, current token balances, loyalty/reward points, reputation scores or badges, and other preferences or attributes. Users 102 register and maintain their accounts via the system's user interface (e.g., a web or app interface provided by the server 112). As used in this disclosure, token can refer to (but is not limited to) digital tokens, virtual raffle tickets, crypto-currencies, or any other unit of value or promised unit of value that can be associated with a user account.

In one use case, a user 102 acts as a seller (also referred to as an "asset owner") who wishes to offer an item (or multiple items) in a raffle-style sale. The item can be a product, good, service, or other asset of value. The offering user 102 provides (uploads) asset information to the system 110. The asset information may include, for example, a description of the item, one or more images of the item, and certain raffle parameters configured by the seller. Raffle parameters can include a minimum selling price (expressed as a number of tokens or tickets) that the seller is willing to accept for the item, and a maximum listing duration (a length of time or an ending date for the raffle). The minimum selling price corresponds to a threshold number of tickets that must be sold for the raffle to proceed. In other words, the raffle will only take place if, by the end of the listing duration, at least that many tickets have been sold (ensuring the seller receives at least their minimum acceptable amount). Optionally, the asset information can also include a maximum number of tickets that will be made available for the raffle (capping the total entries and potentially creating a sense of exclusivity or increasing each ticket's relative odds). The asset owner may further specify whether a winner sell-back option is enabled for this item (i.e., whether the eventual raffle winner will be given an opportunity to sell the item back to the platform or seller for a cash/token payout instead of taking possession of the item). The asset information may also include geographic restrictions—for instance, the seller can limit the raffle to participants in certain countries or regions (due to shipping limitations or legal regulations)—in which case the system 110 will only display the raffle to, or accept ticket purchases from, users in allowed locations.

The system 110 stores the asset information and associated raffle parameters in data store 114 and makes the item available for viewing by other users 102 (potential buyers). The system 110 may organize and present information about the collection of offered items through various discovery interfaces and based on the associated raffle parameters.

Figure 2:
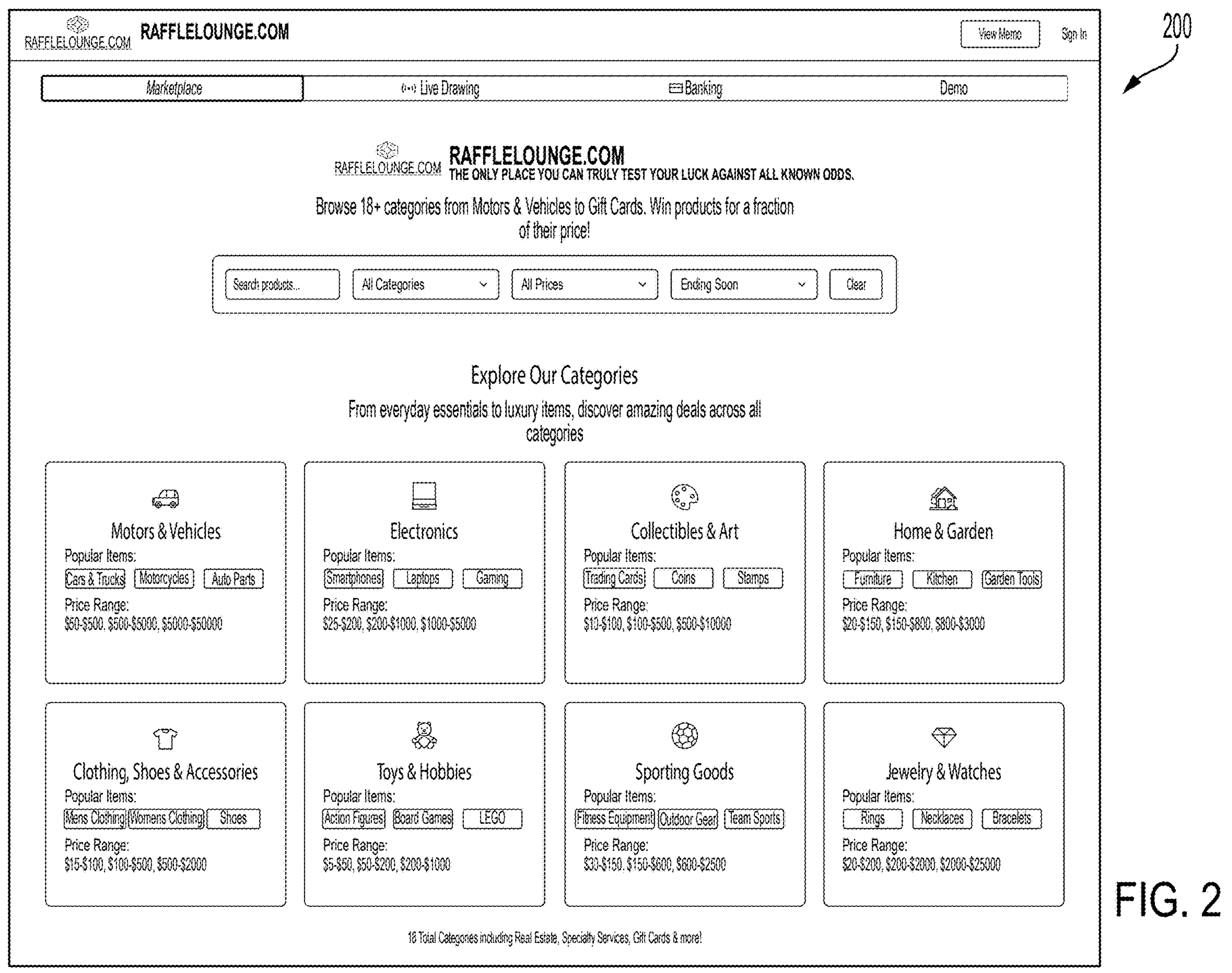
FIG. 2 shows a screenshot of an example user interface for exploring available items.

FIG. 2 shows an example user interface 200 for browsing available items on the platform. The interface 200 allows users to explore items by category, price, popularity, or other search/filter criteria. The system 110 uses the selected criteria to determine which item listings to display to the user 102. In this example, the interface includes navigation or filters for categories and may display summarized information for each listed item.

Figure 3:
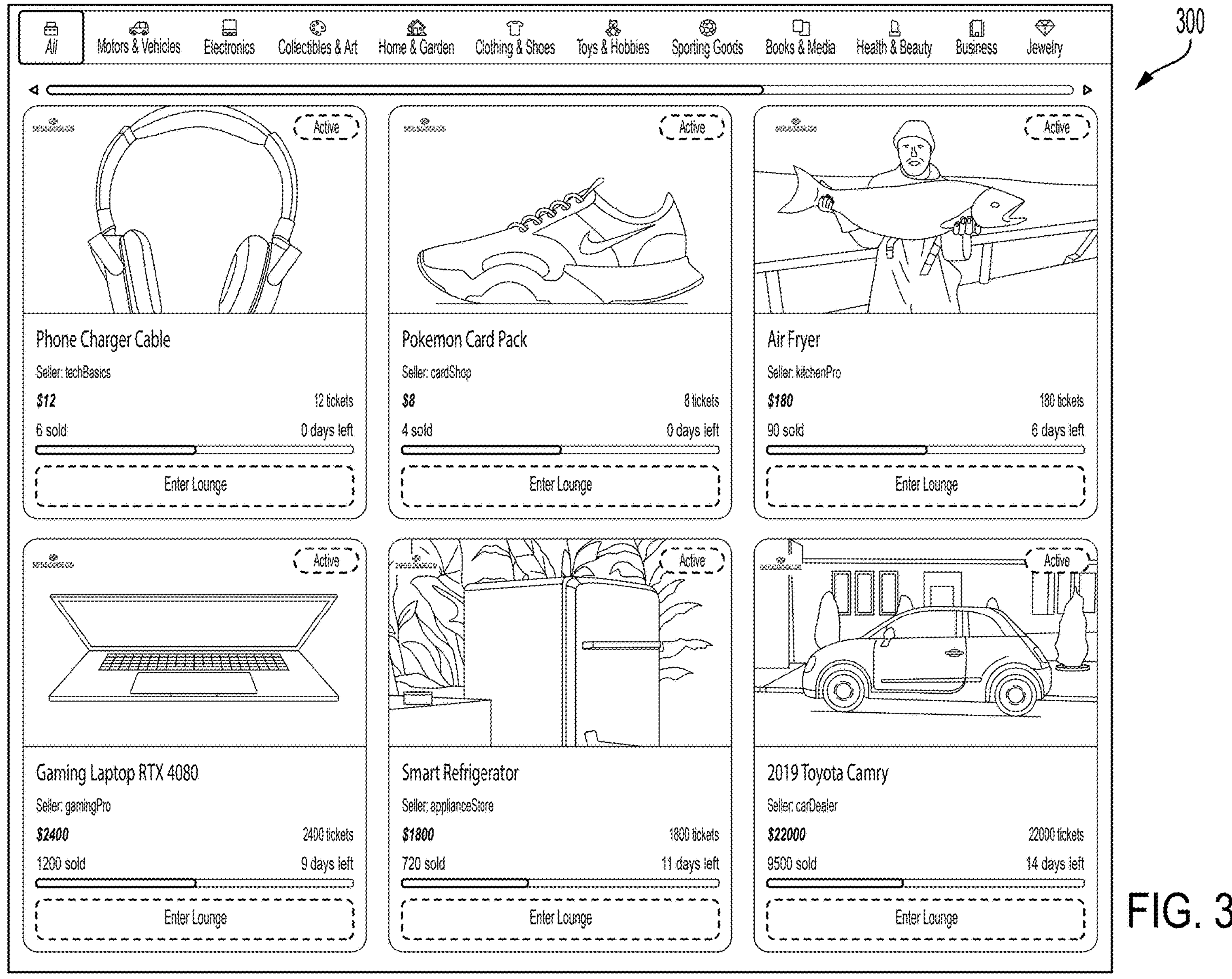
FIG. 3 shows a screenshot of another example user interface presenting listed items with raffle information.

FIG. 3 shows an example user interface 300 presenting representations of multiple offered items (for example, items resulting from a search or filter selection). Each item's representation in interface 300 includes basic details about the item and also highlights any active raffle associated with that item. This information is designed to entice the user to participate in the raffle. For instance, the interface 300 may display a countdown timer indicating the remaining time before the raffle's scheduled drawing (conveying urgency that the opportunity will end soon). It may also show the threshold number of tickets required for the raffle to take place (the minimum selling price in ticket units) and the current number of tickets sold to date for that item's raffle. By showing the current ticket count relative to the threshold and/or maximum, the interface conveys both the progress of the raffle and its exclusivity (for example, if only a limited number of tickets are available or if many have already been sold). Because the price of a single ticket is fixed to a standardized fiat currency amount (e.g., one token equals one U.S. dollar, as explained in more detail below), the threshold number of tickets corresponds to a definite monetary amount (e.g., 100 tickets=$100 minimum selling price). Notably, using whole-token increments (with 1 token=$1) means that all prices and payments in the system can avoid fractional currency, simplifying transactions and understanding for users across different regions.

In interface 300, each item may also feature an option (such as a button or link) to "Enter Lounge" or otherwise join the raffle's dedicated page or room. By selecting this option, the user 102 transitions to a more interactive raffle interface for that specific item-referred to here as the raffle lounge.

Figure 4:
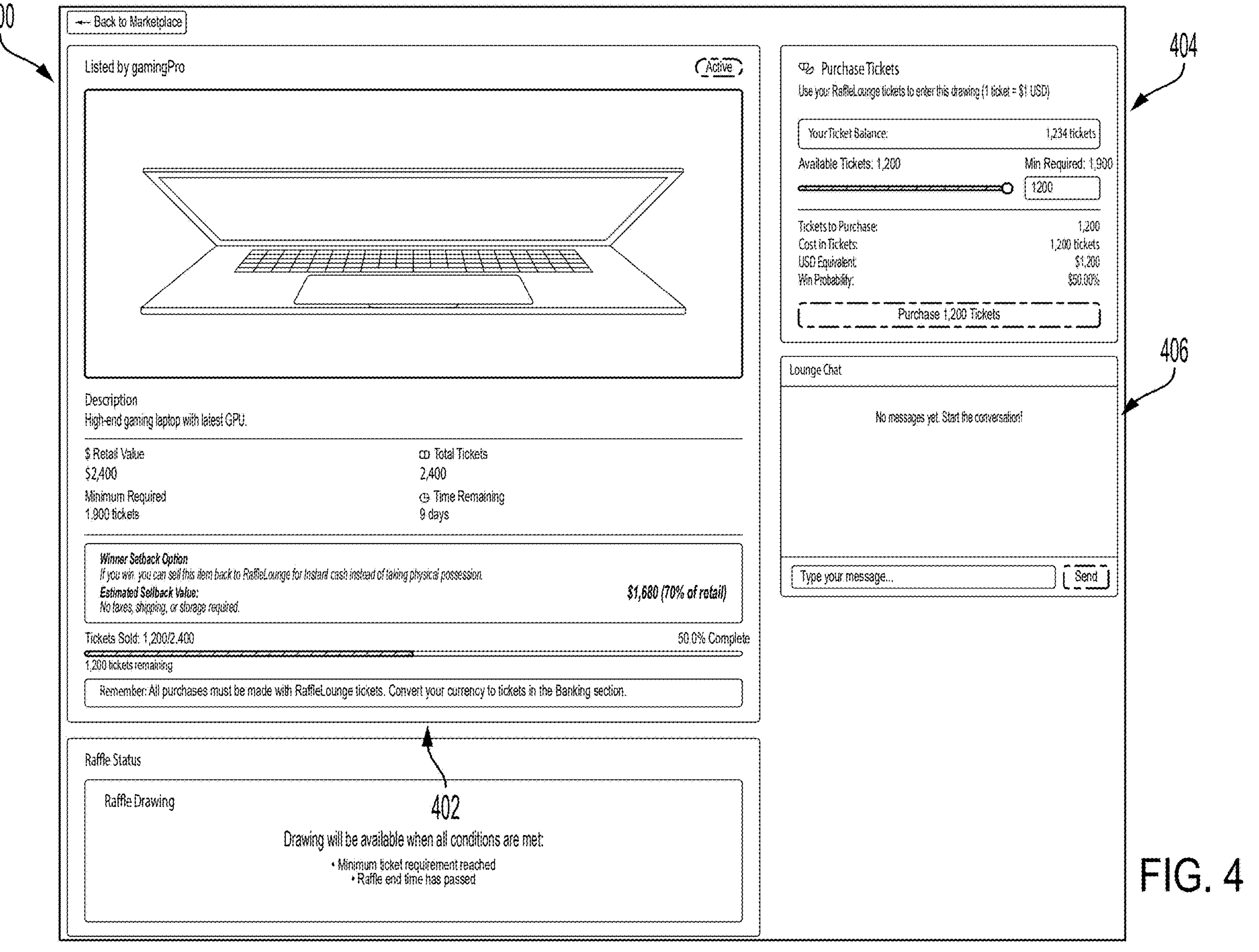
FIG. 4 shows a screenshot of an example "raffle lounge" user interface during an active raffle.
Figure 5:
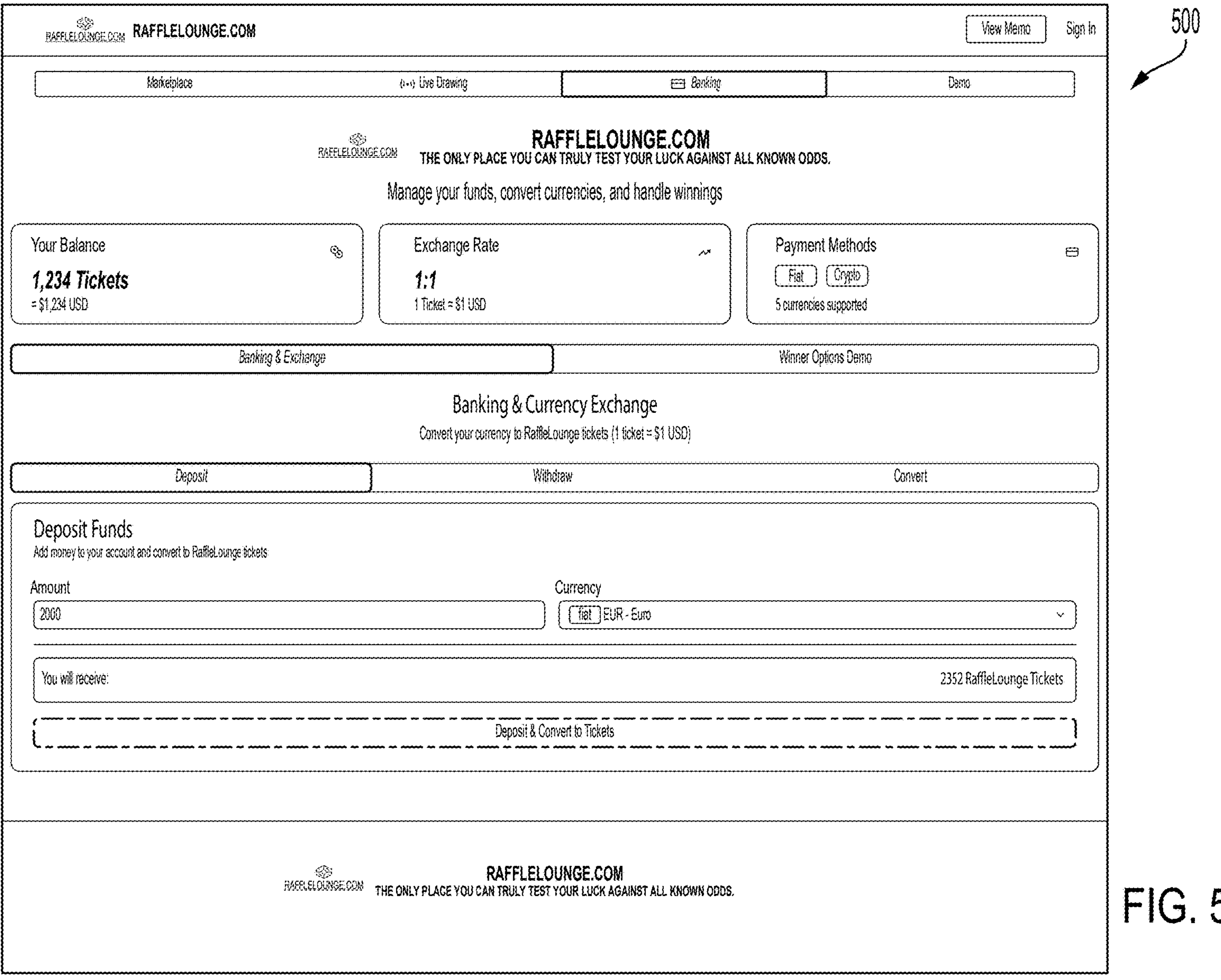
FIG. 5 shows a screenshot of an example ticket-purchasing user interface.

(ii) Raffle Lounge Interface and Ticket Purchase (FIGS. 4 and 5)

FIG. 4 shows a screenshot of an example raffle lounge user interface 400, which provides an immersive, community-oriented experience during an active raffle (i.e., while tickets are being sold, before the drawing). The interface 400 includes an informational portion 402 that displays details about the item and the raffle's status. For example, portion 402 may show the item's name, description, and possibly its retail value, as well as key raffle parameters: the minimum number of tickets that must be sold for the drawing to occur (if applicable), the maximum number of tickets that can be sold (if a cap is set), and the current number of tickets sold so far. This real-time information is intended to generate excitement and urgency. Seeing the ticket count rise in real time and how close it is to the threshold (or how few tickets remain if a maximum is set) can motivate users to participate before the opportunity expires or sells out.

The raffle lounge interface 400 further includes interactive components for both observing and participating in the raffle. For instance, the raffle lounge interface 400 may provide a ticket-purchasing panel 404, through which the user 102 can pledge (purchase) raffle tickets for the item. In some embodiments, panel 404 may list all current raffle participants and their ticket counts in a leaderboard format, highlighting who has bought the most tickets. The interface 400 also preferably displays each participant's current odds of winning the raffle, based on the number of tickets they hold versus the total tickets sold. For example, if a user has purchased 5 out of 100 tickets sold, the interface might show that user's chance of winning as 5%. Each participant's odds can automatically update in real time as more tickets are sold and as participants increase their own ticket counts. By continuously displaying these odds and rankings, the system creates a competitive atmosphere and transparency that further drives engagement.

In addition to the ticket purchasing and status information, the raffle lounge UI 400 includes a chat or community interaction portion 406. The chat portion 406 allows participants (and possibly spectators) to exchange messages, emojis, or other interactions related to the raffle. This live communication channel enhances the sense of community and excitement around the event. In some embodiments, the chat feature may be restricted such that only users who have purchased at least one ticket for the raffle can post messages (making the chat an exclusive perk of participation). In other embodiments, the chat may be open to all viewers, but participating in the chat or viewing it may still encourage onlookers to buy tickets to join the conversation. The community interaction in portion 406 can be moderated and can include features like system messages (e.g., "50 tickets sold-halfway to goal!") or countdown announcements ("Only 1 minute left to buy tickets!") to keep everyone informed. A countdown timer may also be visible (for example, in portion 402 or 406) showing the time remaining until the raffle drawing (the end of the listing duration). In some implementations, this countdown is prominently displayed and may even be graphically emphasized (such as an animated hourglass or ticking clock) to build anticipation as the drawing time approaches.

FIG. 5 illustrates an example ticket-purchasing interface 500 in more detail. This interface can be a dedicated dialog or panel (accessible via the ticket-purchasing portion 404 in the lounge). The interface 500 shows the user's current token or ticket balance (how many tokens the user already has available in their account to spend). It also provides controls for purchasing additional tickets for the current raffle. In one embodiment, interface 500 includes a sliding scale or input field that lets the user choose how many tickets to buy for the item. As the user adjusts this number (for example, moving a slider or typing a value), the system automatically calculates and displays the user's updated odds of winning based on that number of tickets. This real-time odds feedback (powered by the odds engine using the ratio of the user's tickets to total tickets) allows the user to see the impact of buying more tickets on their chances.

The price of a raffle ticket is fixed and transparently shown. In the illustrated example, each ticket is equivalent to a set unit of currency (e.g., $1 USD). Thus, if the user chooses to buy 10 tickets, the cost will be $10 (or 10 tokens). Interface 500 allows the user to pay for tickets using various methods: they might use their existing token balance, or if needed, purchase new tokens on the spot. The system supports funding token purchases via bank transfers, credit/debit cards, or third-party payment services (e.g., Zelle®, PayPal®, Venmo®), as well as cryptocurrency payments. If a user chooses to pay in a foreign currency or cryptocurrency, the system 110 automatically converts that payment into the equivalent number of USD-valued tokens. For example, a user in Europe could pay 10 Euros, which the system converts to approximately $10 (assuming a 1:1 token to USD ratio) and credits 10 tokens to the user's account. By handling currency conversion internally and maintaining the token at a fixed USD value, the platform abstracts away exchange rate complexities and ensures every token/ticket in circulation represents the same real value, no matter who purchased it or with what currency.

Once the user selects the desired number of tickets, they confirm the purchase, and the system 110 deducts the corresponding tokens (or processes the payment to add tokens) and increments the raffle's ticket count accordingly. After purchase, the interface updates: the user's new token balance is shown, the total tickets sold for the raffle increases, and all users' odds of winning are recalculated and updated in the lounge interface 400 (and any other interface where odds are displayed). The system may also visually acknowledge the purchase in the lounge (e.g., a brief highlight on the leaderboard or a chat message like "User123 bought 5 tickets!") to further stimulate activity.

Figure 6:
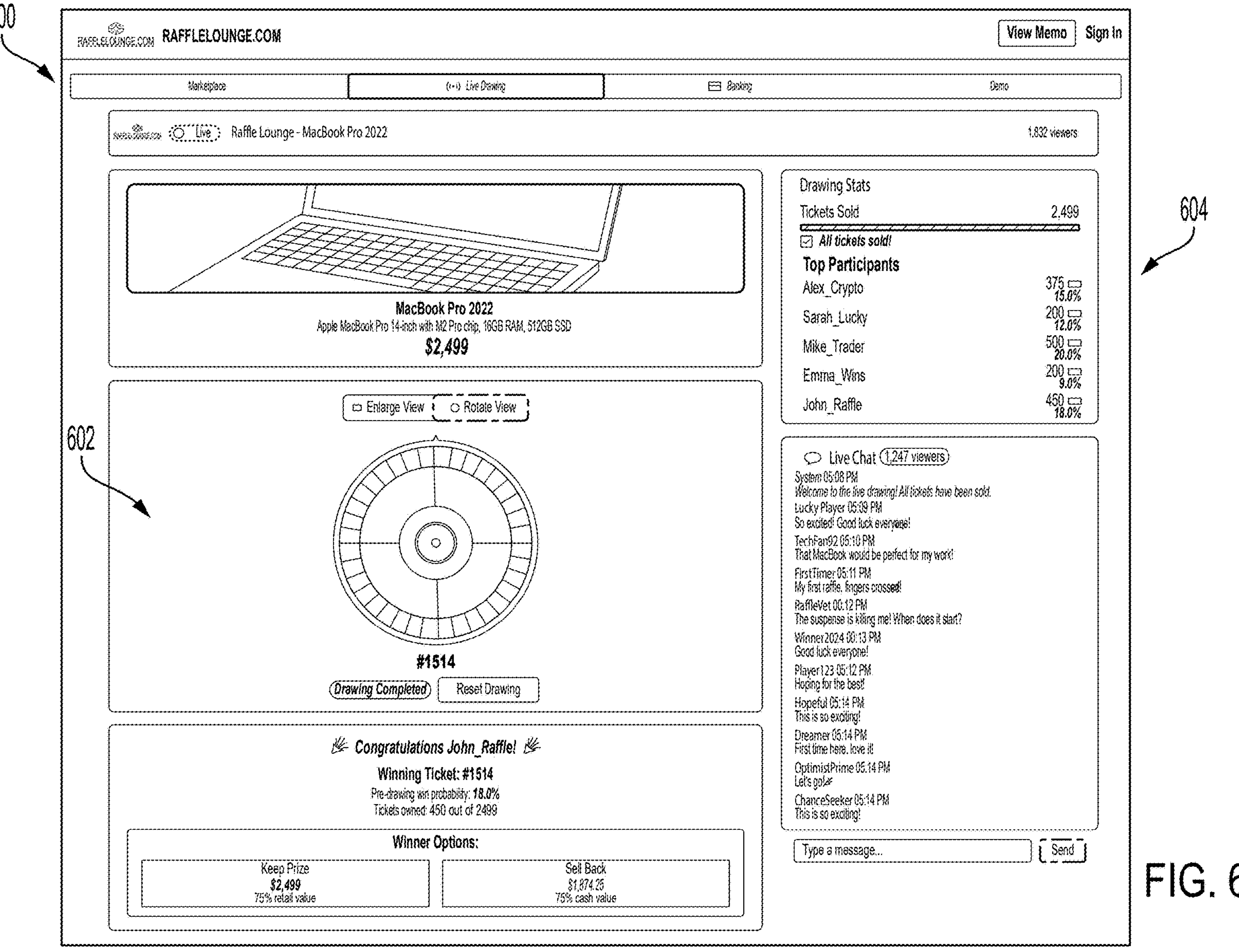
FIG. 6 shows a screenshot of an example raffle drawing interface.

(iii) Live Raffle Drawing and Outcome (FIG. 6)

FIG. 6 shows an example user interface 600 depicting the live raffle drawing phase. When the raffle's listing duration ends (or when all tickets have been sold, or a user triggers a buyout as discussed below), the system proceeds to determine a winner. The interface 600 is designed to make this winner selection moment engaging and transparent. It includes a drawing animation portion 602 and a raffle statistics portion 604.

In the drawing animation portion 602, the system may display a real-time animation to simulate the drawing process. For example, a spinning roulette wheel, a random ticket number shuffler, or bouncing lottery balls could be shown-any visual that represents randomness and builds suspense. A countdown timer may also be displayed, counting down the final seconds to the winner reveal. The timer can be accompanied by animations (e.g., a ticking clock or diminishing bar) and, optionally, dramatic effects (like flashing lights or sound effects), to heighten anticipation among the participants watching live. In some embodiments, the system 110 pushes the animation through the network to the user devices 104 to cause the animation to be synchronized in time between the participants. This type of real-time interactive interface that overcomes technical problem of keeping distributed users engaged during an online sales event.

As the countdown reaches zero, the animation portion 602 indicates the winning ticket or winning token. For instance, the interface might graphically highlight the winning token number or display the username of the winner in a celebratory fashion. The system 110 determines the winner by randomly selecting one token out of all tokens sold for that raffle, using a suitable probabilistic algorithm or random number generator. Because each token is identical in value and represents one entry, the probability of any given token being chosen is uniform; thus a user's chance of winning is exactly the fraction of total tokens they hold (which is why displaying the odds as described earlier is accurate).

The raffle statistics portion 604 displays information about the participants and the final status of the raffle. Prior to the drawing, portion 604 may list each participant's name (or alias) alongside the number of tickets they purchased and their current odds of winning. This list can update in real time as tickets are sold (as noted earlier). During or after the drawing, this portion can be updated to highlight the winner and show final statistics (e.g., total tickets sold, the winning ticket identifier, perhaps the winning probability). By presenting this information, even the users who did not win can see the outcome clearly—for example, it might say "Winner: User123 (with ticket #57)" so that others know the result was fair and random.

Immediately after a winner is determined, the interface 600 (particularly the drawing animation portion 602) may present the winner with two actionable options: "Claim Item" or "Sell Item Back." The "Claim Item" option allows the winner to accept the prize (the item will be transferred to them). The "Sell Back" option provides the winner an opportunity to effectively cash out instead of taking possession of the item. In other words, the platform offers to pay the winner a certain amount of money (or tokens) in exchange for the item, letting the winner forego ownership. The availability of this sell-back feature may depend on the seller's configuration or platform policy; if enabled, it caters to winners who might experience "buyer's remorse" or who participated mainly for the thrill and would prefer money over the item.

If the winner elects to claim the item, the system proceeds to facilitate the transfer of ownership. This can involve generating a notification or message confirming their win and requesting any necessary actions (for example, providing a shipping label if it's a physical good). The platform then coordinates delivery or pickup of the item to the winner. In implementation, transferring ownership may include updating the system's database to record that the item now belongs to the winner and marking the raffle as completed. It may also involve sending instructions to a fulfillment center or the original item owner to ship the item to the winner. For tangible goods, the platform or seller ships the item; for digital goods or services, access rights might be transferred electronically.

If the winner chooses the sell-back option, the system 110 will pay the winner a specified amount of money (or tokens) in lieu of the item. The system 110 may determine the sell-back amount in various ways: for example, it could be a predetermined percentage of the item's original value or asking price, or it might be based on the total token pool collected. In some embodiments, the sell-back payout might be slightly less than the item's full value (to provide an incentive for the platform or seller to accept returned items and re-raffle them), effectively giving the winner a cash prize and the platform the item back to re-list. Once the winner accepts the sell-back offer, the platform credits the winner's account with the agreed amount (or initiates a payment to the winner through their registered payment method) and retains or repossesses the item.

When a sell-back occurs, the system 110 can automatically relist the item for a new raffle (a "secondary raffle"). Essentially, the item goes back into the marketplace to be won by someone else, thus extending its journey on the platform. The new raffle may reuse the original parameters (same minimum ticket threshold, duration, etc.) or adjust them. In some examples, the system may leverage analytics from the first raffle to optimize the second. For instance, if the first raffle sold out all tickets very quickly, the system 110 might increase the minimum ticket count or shorten the duration for the relist, anticipating high demand. Conversely, if the first raffle barely met the threshold at the last minute, the system might reduce the required ticket count or extend the duration to attract more participants for the next round. Various data points-such as how fast tickets sold, how many users participated, the level of chat engagement, etc.—can inform these adjustments. The goal is to tune the raffle parameters to maximize success and user interest in subsequent rounds. (For example, the system might determine: "The first raffle reached 100% of its goal in half the allotted time; for the relist, we can safely increase the ticket threshold by 20% or reduce the time window.") In the absence of automated adjustment, the default could be to use the same parameters as the initial raffle, unless manually changed by the seller or platform.

If the winner neither explicitly claims the item nor opts for sell-back within a given decision period (for example, 24 hours after the drawing), the system may default to treating it as a claim (and proceed with transferring the item to the winner). This ensures that the raffle concludes definitively, and the item does not remain in limbo.

Throughout the drawing phase and immediately after, the platform may generate various notifications: the winner is notified of their win (and presented with options as described), and all non-winning participants may also receive a notification (for example, via the app, email, or SMS) informing them that the raffle has concluded and identifying the winner. This transparency—letting all participants know the outcome—helps build trust in the system. Non-winners might also be encouraged to participate in other raffles (the notification could include a message like "Thank you for participating! Better luck next time—check out these other active raffles you might be interested in.").

(iv) Community Features and Gamification

One of the underlying objectives of the RaffleLounge platform is to foster a vibrant community and reward user engagement. As mentioned, the community interaction/chat feature (FIG. 4, element 406) allows users to socialize around the raffle experience, which is a stark contrast to traditional silent auctions. This feature is design to make the process more enjoyable and increase user retention and time spent on the platform. In some embodiments, the platform may implement community reputation metrics or tiered membership levels. For example, users could earn a reputation score based on their activities—such as participating in raffles, hosting raffles (selling items), contributing in chat with helpful or popular comments, and promptly completing transactions. High-reputation users might be denoted with special badges visible next to their username. The reputation or badge status could influence the platform in various ways: certain high-value raffles might be restricted to users above a certain reputation level (to ensure seriousness or trustworthiness), or users with higher reputation might have their item listings featured more prominently to buyers. Likewise, new users or users with lower reputation might be limited in how many raffles they can join simultaneously, until they build a track record. These mechanisms encourage fair play and community trust, as users are incentivized to maintain a good reputation.

The platform also embraces gamified participation incentives. Users may be awarded virtual rewards for their engagement—for instance, loyalty points for every ticket they purchase, or bonus points for participating in a certain number of raffles, for referring new users, or for hosting a raffle that successfully concludes. These points can accumulate in the user's account. The user can later redeem points for free or discounted raffle tickets, entry into special exclusive raffles, merchandise, or other benefits within the platform. In one embodiment, for example, 100 loyalty points might be redeemable for 1 raffle token. The system could also have achievement badges (e.g., "Veteran Raffler" for someone who has entered 50+ raffles, "Lucky Winner" for someone who won multiple times, "Super Seller" for those who successfully hosted several raffles, etc.). These badges could be displayed in the user's profile and next to their name in chats or listings, conferring prestige.

The awarding of points or badges can be handled automatically by the system 110. For instance, the system 110 monitors user participation and various metrics: number of raffles joined, tickets purchased, chat messages posted, items sold, etc. Based on predefined rules, the system allocates points or triggers badge awards when criteria are met. (For example, "Award 10 points for every raffle entered, up to 50 points per week" or "Award 'Community Helper' badge if a user's chat messages receive 100 up-votes from others.") These reward mechanisms are implemented via software modules on the server 112, which update each user's profile data in the data store 114 accordingly. The purpose of these gamification features is to encourage users to remain active, try out more raffles, and contribute positively to the community, thereby increasing overall engagement and the platform's vitality.

Figure 7:
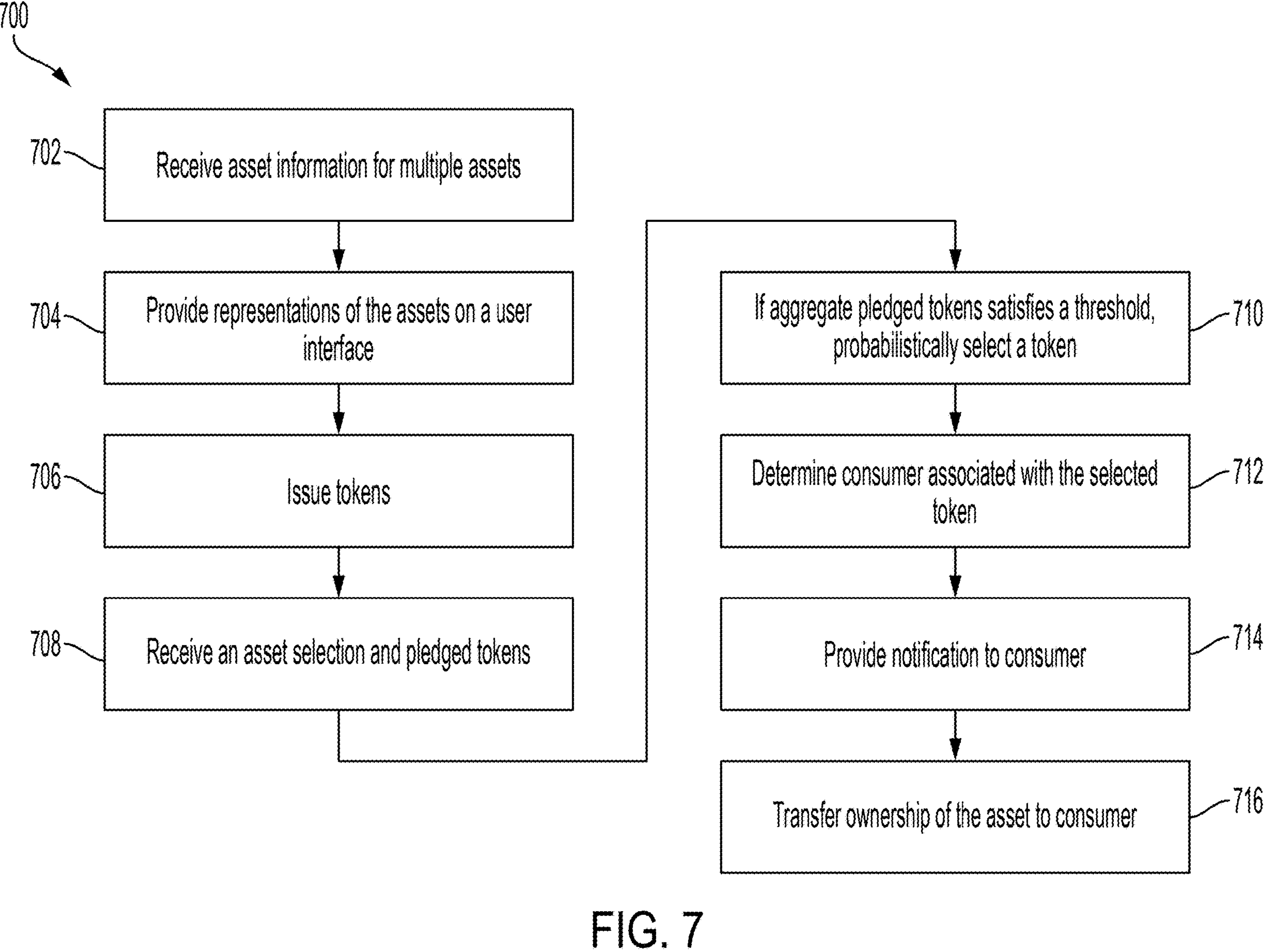
FIG. 7 shows a flowchart of an example method of conducting a raffle and transferring ownership of an asset.

(iv) Example Raffle Process Flow (FIG. 7)

FIG. 7 provides a flowchart 700 of an example method embodying the raffle process, from item listing to winner determination and post-raffle actions. This method may be implemented by the system 110 (e.g., by the server 112 executing the necessary instructions stored in memory.

At step 702, the method begins with receiving, from asset owners (sellers), the asset information for multiple assets to be listed. As discussed, the asset information includes at least a minimum selling price (in tokens/tickets) and a maximum listing duration for each raffle. It may also include other parameters like a maximum ticket count, sell-back option flag, and geographic restrictions, as well as descriptive details (e.g., title, description, photos of the item).

Next, at step 704, the system provides representations of these assets to potential buyers (consumers) via the user interface. This corresponds to populating interfaces (e.g., 200, 300) with item listings. Each item's listing shows the relevant information such as images, the minimum selling price (converted to an easy-to-read format, e.g., "100 tickets minimum"), current progress (tickets sold so far), the time remaining (countdown to raffle end), and any other salient details (for example, "Exclusive raffle—max 200 tickets" or indicators like "Sell-back option available" if applicable). The representation essentially serves as an invitation for consumers to participate in the raffle for that item.

At step 706, the system receives, from one or more consumers, an asset selection and a pledged amount of tokens for that asset. In practice, this means a user selects a particular item and commits to buying a certain number of tickets for it. This step is facilitated by the ticket-purchase interface 500. The system records each ticket purchase, associating the purchased tokens with the specific raffle and the purchasing user. It continuously updates the aggregate pledged tokens for the item (essentially a running total of tickets sold).

The consumer interactions in step 706 can occur multiple times as many users participate. The system may also, as part of this step, display to each consumer their odds of winning upon their selection/purchase (as described with the dynamic interface). This gives immediate feedback and allows users to make informed decisions (and possibly increase their pledged amount if they desire better odds). Providing continuous, real-time feedback in this way is designed to drive user engagement.

Decision step 708 (implicit in the flowchart 700) is the condition that the raffle will only proceed if the threshold (minimum selling price in tokens) is met by the end of the listing duration. The system monitors the value of aggregate pledged tokens for each raffle as time progresses. If the listing duration expires and the total tokens pledged is below the required minimum, the raffle may be canceled and all pledged tokens returned or refunded to the would-be participants (this outcome can also be communicated in the listing rules to manage user expectations). However, assuming the minimum number of tokens is satisfied within the allotted time, the raffle is valid and can conclude with a winner selection. In many cases, the threshold might be met well before the end of the duration; regardless, the drawing happens at the predefined end time (unless a buyout or all tickets sold scenario triggers it sooner).

Optionally, the system may allow an early termination (buyout): if at any point a single user decides to purchase all remaining tickets (up to the threshold or the maximum) effectively paying the full price, the condition for the raffle is satisfied and that user can automatically be declared the winner. In such a scenario, the method would detect that one consumer holds 100% of the tickets for the asset. The platform may then forego the random drawing and immediately designate that consumer as the winner (since no randomness is needed if only one person owns all entries). In practice, if other users had already bought some tickets before the buyout, the platform could either disable the buyout option or, if a buyout is still allowed, refund those other purchasers when the item is claimed outright by the buyer. The rules for this can be set in the platform's terms; for clarity, in one embodiment, a buyout might only be offered if no other tickets have been sold yet, or it could be offered at any time with automatic refunds to others upon execution. The buyout mechanism ensures that sellers have an avenue to get the full ask price immediately and that highly interested buyers can guarantee acquisition of an item without chance, by essentially paying the item's full value in tokens.

At step 710, assuming the raffle proceeds normally (threshold met, multiple participants), the system determines a raffle winner by probabilistically selecting one of the pledged tokens at random. This can be implemented by generating a random number between 1 and the total number of tokens sold and identifying which token (and thus which user) corresponds to that number. Each token is effectively a "lottery ticket" with an equal chance. The selected token's owner is the winner.

Step 710's outcome leads to step 712, determining the consumer associated with the selected token (i.e., looking up which user account purchased that winning token). This is straightforward since the system has records mapping each token to the purchasing user.

At step 714, the system provides a notification to the winner. This notification includes an offer to transfer ownership of the specific asset to that user, essentially informing them "Congratulations, you won!" and prompting them to claim their prize. The notification can be delivered through the app interface (as a popup or message in the raffle lounge), and additionally via email or push notification for redundancy. Along with congratulations, this message may recap what they've won and outline next steps (e.g., "Click here to provide your shipping address" or "You have 24 hours to decide whether to claim the item or sell it back.").

If the sell-back feature is enabled for this raffle (as per the seller's setting or platform default), step 714 can also include providing a second notification or option to the same winner offering a specified monetary amount in lieu of the item. In practice, the winner's notification UI might present two buttons: "Claim Item" and "Sell Back for $X." The specified amount $X (or equivalent in tokens/credits) is predetermined-possibly listed in the raffle rules ahead of time. For example, it might say: "We will pay you $80 if you choose not to take the item (item's full value was $100)." This gives the winner a clear choice.

At step 716, in response to the winner accepting the offer to claim the item (i.e., if they click "Claim Item" or otherwise indicate they want the item), the system proceeds to transfer ownership of the asset to the consumer. As discussed, this involves updating the database to record the new owner, and initiating any fulfillment process required to deliver the item to the winner. This step effectively completes the raffle transaction: the seller will receive the proceeds (the total tokens collected, which can be converted to the seller's desired currency), and the winner receives the item.

If, instead, the winner accepted the sell-back offer, the flow goes to step 718 (corresponding to the additional steps in the method for the sell-back scenario). At step 718, the system pays the specified amount of money (or tokens) to the consumer (winner). This could be done by crediting their account with tokens that they can withdraw as cash, or directly issuing a payment through their on-file payment method. Once this payment is confirmed, the winner effectively relinquishes their claim to the item.

Following a sell-back and payout, the system triggers step 720, which is relisting the specific asset for an additional listing duration (starting a new raffle for the same item). The item is placed back into the active listings (e.g., via interfaces 200, 300), possibly with a notation that it's a "Second Chance Raffle" or similar, and the cycle begins anew. The parameters for the new raffle may be the same as before unless the system or seller adjusts them as noted. The community may be notified that the item is back (which can draw even more interest because now it's like a proven exciting item-someone won it and sold it back, so others get another shot).

Throughout this process, the platform ensures that all financial transactions are properly handled: token purchases are secured, conversions are performed at fair market rates, payouts (to sellers or winners) are executed safely, and all actions are logged for auditability. Security measures, such as random draw algorithms, may be verifiable or certified to assure users of fairness.

Figure 8:
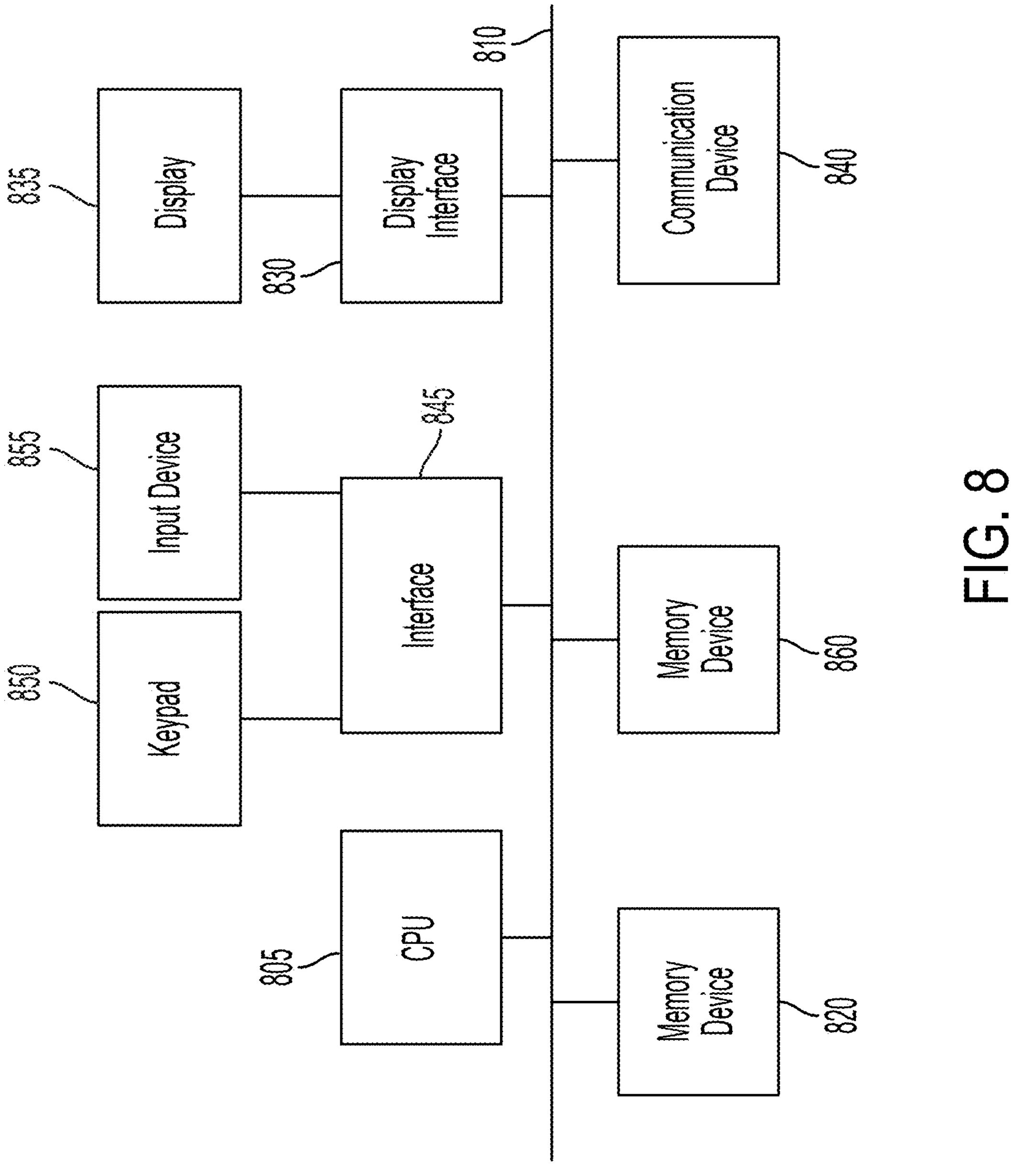
FIG. 8 shows a block diagram of an example of internal hardware that may be used to contain or implement program instructions according to an embodiment.

(iv) Example Hardware Implementation (FIG. 8)

FIG. 8 illustrates example internal hardware 800 that can be used to implement the computing components of the system 110 (such as server 112). A bus 810 serves as the main information highway interconnecting the other illustrated components of the hardware. One or more processors 805 are the central processing units of the system, configured to execute program instructions for the platform (for example, performing the raffle logic, updating databases, running the web server, etc.). The term "processor" as used herein can refer to a single processing device or multiple processors working in parallel or in distributed fashion (e.g., CPU clusters, GPU arrays, cloud computing resources, etc.).

Memory devices 820 (which may include read-only memory (ROM), random-access memory (RAM), flash memory, or hard disk drives, among others) provide storage for the software instructions and data. These memory devices represent examples of non-transitory computer-readable storage media that contain program code and data for implementing the methods described. For instance, the software modules for handling user accounts, token transactions, raffle logic, real-time communications, etc., are stored in memory 820 and executed by the processor 805. The memory also stores the system's databases (e.g., user account data, item listings, token ledgers, transaction history, chat logs, etc.), either in local storage or via connections to external storage systems Program instructions, software or interactive modules for providing the interface and performing any querying or analysis associated with one or more data sets may be stored in the memory device 820. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

The system hardware 800 may include a display interface 830 and associated display device 835 to present information to an administrator or operator (in a server scenario this may be minimal, but in user devices 104, the display interface is what drives the UI seen in FIGS. 2-6). The hardware can further include communications interfaces/ports 840 which enable network communication over the Internet or other networks (such as Ethernet, Wi-Fi, cellular data networks, etc.). This allows the server 112 to communicate with user devices and process payments via external payment networks, and generally to be connected to the broader network environment 120.

User interface components such as input devices (keyboard, mouse, touchscreen, microphone, camera, etc.) 855 can be present especially in the context of user devices 104 (which have their own similar hardware architecture). The server side might not need extensive UI devices, but the user side would use these to operate the app (e.g., touch inputs on a smartphone to buy tickets, camera to possibly scan QR codes or capture images if needed for verification, etc.).

It should be understood that the hardware described in FIG. 8 is one example configuration. The platform could be implemented on cloud infrastructure distributed across many physical machines, where the "processor" is a cluster of servers and the "memory" includes cloud storage services. Likewise, the user's client device (phone, computer) has its own processor and memory running a client-side application. All such variations, as long as they include at least one processor executing instructions from at least one memory to perform the functions described, fall within the scope of the computing systems contemplated by this disclosure.

In this document, an "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In summary, the disclosed RaffleLounge system provides a technical framework for an online raffle marketplace that standardizes monetary value through tokens, allows real-time interactive engagement, and introduces flexible features (like sell-back, buyout, community chat, and gamification) that overcome many drawbacks of traditional online auctions and raffles. The techniques described herein can be embodied in various combinations of hardware and software. The scope of the invention, as defined by the claims below, is intended to cover all such variations and modifications.

While the invention has been described with specific embodiments, other alternatives, modifications and variations will be apparent to those skilled in the art. Accordingly, it will be intended to include all such alternatives, modifications, and variations within the spirit and scope of the appended claims.

The invention claimed is:

1. A method for enhancing user engagement in a networked raffle system, the method comprising:

receiving, from an asset owner, asset information for an asset, the asset information including a minimum selling price expressed in raffle tokens and a maximum listing duration for an initial raffle of the asset;

providing, to one or more consumers, a representation of the asset via a user interface, the representation including information based on the asset information, wherein the user interface provides an indication of a sell-back option comprising an offer to pay a raffle winner a predetermined amount of money in lieu of transferring ownership of the asset;

issuing, to the one or more consumers, a plurality of raffle tokens each having a predefined monetary value of one United States dollar;

receiving, from at least one consumer, an asset selection comprising an indication of the asset and a pledged amount of the raffle tokens for entry into the initial raffle;

in response to receiving the asset selection from the at least one consumer, automatically calculating, by one or more processors of a computing system, odds of the at least one consumer winning the initial raffle, the odds being based on the pledged amount of raffle tokens by the at least one consumer relative to aggregate pledged raffle tokens for the asset, and dynamically updating, in real time, a user interface display to present the calculated odds to the at least one consumer, wherein the user interface display recalculates and updates the odds after each time any consumer pledges additional raffle tokens for the asset; and in response to a value of aggregate pledged raffle tokens for the asset satisfying the minimum selling price during the maximum listing duration:

determining a raffle winner by probabilistically selecting one of the pledged raffle tokens from the aggregate pledged raffle tokens;

determining a consumer associated with the selected raffle token;

providing a first notification to the consumer associated with the selected raffle token, the first notification comprising an offer to transfer ownership of the asset to the consumer;

providing a second notification to the consumer associated with the selected raffle token, the second notification comprising an offer to pay the consumer the predetermined amount of money of the sell-back option in lieu of transferring ownership of the asset; and in response to the consumer accepting the offer of the second notification: paying the predetermined amount of money to the consumer; and automatically relisting the asset for a subsequent raffle having a further listing duration, wherein relisting the asset comprises adjusting values of one or more parameters of the subsequent raffle to be different than corresponding parameter values of the initial raffle.

2. The method of claim 1, wherein providing the representation of the asset comprises, for the asset, generating a user interface comprising an image of the asset, an indication of the minimum selling price, a current value of the aggregate pledged raffle tokens for the asset, and an indication of the maximum listing duration for the initial raffle.

3. The method of claim 1, further comprising, in response to receiving the asset selection from the consumer:

automatically calculating odds of the consumer winning the initial raffle, the odds being based on the pledged amount of tokens by the consumer relative to the aggregate pledged tokens; and generating a user interface comprising the calculated odds for the consumer.

4. The method of claim 1, wherein providing the representation of the asset further comprises generating a user interface comprising, for each consumer who has made an asset selection, the pledged amount of raffle tokens by that consumer and odds of that consumer winning the initial raffle.

5. The method of claim 1, wherein:

receiving, from the at least one consumer, the asset selection comprising the indication of the asset and the pledged amount of the raffle tokens for entry into the initial raffle comprises receiving, from each of a plurality of consumers, a separate asset selection; and the method further comprises, in response to determining the consumer associated with the selected raffle token as the winner, providing a notification to at least one other consumer who is not associated with the selected raffle token, the notification indicating an outcome of the initial raffle and an identity or identifier of the raffle winner.

6. The method of claim 1, wherein providing the representation of the asset further comprises generating a community interaction interface associated with the initial raffle, the community interaction interface configured to allow consumers to exchange messages related to the initial raffle.

7. The method of claim 6, wherein generating the community interaction interface further comprises generating the community interaction interface comprising a countdown timer indicating a time remaining before a scheduled raffle drawing.

8. The method of claim 6, wherein generating the community interaction interface further comprises generating the community interaction interface comprising an animated graphical sequence during selection of the raffle winner, the animated graphical sequence visually simulating a random drawing process, and pushing the animated graphical sequence through a network to a user device for display to the consumer.

9. The method of claim 1, wherein receiving the asset selection from the consumer comprises: providing, to the consumer, a user interface element for specifying the pledged amount of raffle tokens; and receiving, via the user interface element, an input from the consumer indicating the pledged amount of raffle tokens to purchase for the initial raffle.

10. The method of claim 1, wherein issuing the raffle tokens comprises issuing units of a digital currency that is pegged to the United States Dollar.

11. The method of claim 10, wherein issuing the raffle tokens comprises issuing stablecoins.

12. The method of claim 1, wherein issuing the raffle tokens comprises issuing units of a Central Bank Digital Currency.

13. The method of claim 12,
wherein: issuing tokens comprises:
receiving, from the consumer, a payment of monetary value in exchange for the raffle tokens; and
converting, if the payment is not in United States dollars, the monetary value into United States dollars based on one or more exchange rates so as to determine an equivalent number of whole raffle tokens to issue.

14. The method of claim 1, further comprising awarding one or more virtual rewards to users based on participation in one or more raffles, the virtual rewards including at least one of loyalty points or achievement badges.

15. The method of claim 1, further comprising receiving, from the asset owner, one or more additional raffle configuration parameters for the asset, the one or more additional raffle configuration parameters including: a maximum number of raffle tickets available for the initial raffle of the asset; an indication of whether a winner sell-back option is enabled for the initial raffle; or one or more geographic restrictions defining eligible participant locations for the initial raffle.

16. The method of claim 1, wherein:
one or more steps of the method are performed by an online marketplace system, wherein consumers have associated reputation scores or levels within the online marketplace system; and
the method further comprises restricting issuing raffle tokens to consumers who satisfy a predetermined community reputation criterion within the online marketplace system.

17. A system comprising: one or more processors and a non-transitory machine-readable storage medium coupled to the one or more processors and storing instructions that, when executed by the one or more processors, cause the system to perform operations comprising the steps of the method of claim 1.

18. The method of claim 1, wherein adjusting values of one or more parameters of the subsequent raffle comprises adjusting the maximum listing duration or the minimum selling price.

19. The method of claim 1, wherein adjusting values of one or more parameters of the subsequent raffle comprises analyzing one or more aspects of the initial raffle.

20. The method of claim 1, wherein adjusting values of one or more parameters of the subsequent raffle comprises adjusting values of one or more parameters of the subsequent raffle based on demand during the initial raffle.

* * * * *